United States Patent
Cho et al.

(10) Patent No.: US 10,924,792 B2
(45) Date of Patent: *Feb. 16, 2021

(54) SYSTEM AND METHOD FOR SURVEYING BROADCASTING RATINGS

(71) Applicant: Enswers Co., Ltd., Seoul (KR)

(72) Inventors: Hoon-Young Cho, Seongnam (KR); Kil-youn Kim, Seoul (KR); Jaehyung Lee, Seoul (KR)

(73) Assignee: Enswers Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,183

(22) Filed: Dec. 10, 2019

(65) Prior Publication Data
US 2020/0120373 A1    Apr. 16, 2020

Related U.S. Application Data

(63) Continuation of application No. 16/180,523, filed on Nov. 5, 2018, now Pat. No. 10,536,736, which is a (Continued)

(30) Foreign Application Priority Data

Jan. 23, 2013 (KR) ........................ 10-2013-0007660

(51) Int. Cl.
*H04H 60/56* (2008.01)
*H04H 60/31* (2008.01)
(Continued)

(52) U.S. Cl.
CPC ...... *H04N 21/25891* (2013.01); *H04H 60/31* (2013.01); *H04H 60/37* (2013.01);
(Continued)

(58) Field of Classification Search
CPC ....... H04N 21/25891; H04N 21/25883; H04N 21/4126; H04N 21/4394; H04N 21/4415;
(Continued)

(56) References Cited

U.S. PATENT DOCUMENTS 8,387,084 B1 * 2/2013 Klappert ............ H04N 21/4126
725/25
2007/0143778 A1    6/2007 Covell et al.
(Continued)

FOREIGN PATENT DOCUMENTS

EP         1 542 381         6/2005
JP        2006-222574        8/2006
(Continued)

OTHER PUBLICATIONS

KR 2010-0000464_System and Method for surveying audience rating using sound code_by Kim (Year: 2010).*

Primary Examiner — Nathan J Flynn
Assistant Examiner — Caroline Somera
(74) Attorney, Agent, or Firm — McDonnell Boehnen Hulbert & Berghoff LLP

(57) ABSTRACT

A system and method in which a TV signal reception device (e.g., set top box) receives a broadcast signal, sends the broadcast signal to a TV, and sends an event signal to a rating statistics information server or associated user terminal when a predetermined condition occurs, to ultimately cause an associated user terminal to generate fingerprint data of audio from the TV and to provide the fingerprint data to the server so as to facilitate channel identification and generation of ratings statistics.

20 Claims, 5 Drawing Sheets

Related U.S. Application Data continuation of application No. 15/496,888, filed on Apr. 25, 2017, now Pat. No. 10,165,317, which is a continuation of application No. 14/762,570, filed as application No. PCT/KR2013/000576 on Jan. 24, 2013, now Pat. No. 9,668,008.

(51) Int. Cl.

| | | |
|---|---|---|
| *H04H 60/37* | (2008.01) | |
| *H04H 60/45* | (2008.01) | |
| *H04H 60/58* | (2008.01) | |
| *H04N 21/472* | (2011.01) | |
| *H04H 60/46* | (2008.01) | |
| *H04N 21/4415* | (2011.01) | |
| *H04N 21/258* | (2011.01) | |
| *H04N 21/439* | (2011.01) | |
| *H04N 21/442* | (2011.01) | |
| *H04N 21/658* | (2011.01) | |
| *H04H 60/43* | (2008.01) | |
| *H04N 21/41* | (2011.01) | |

(52) U.S. Cl.
CPC ............ *H04H 60/43* (2013.01); *H04H 60/45* (2013.01); *H04H 60/46* (2013.01); *H04H 60/56* (2013.01); *H04H 60/58* (2013.01); *H04N 21/25883* (2013.01); *H04N 21/4126* (2013.01); *H04N 21/4394* (2013.01); *H04N 21/4415* (2013.01); *H04N 21/44222* (2013.01); *H04N 21/472* (2013.01); *H04N 21/6582* (2013.01)

(58) Field of Classification Search
CPC .......... H04N 21/44222; H04N 21/472; H04N 21/6582; H04H 60/31; H04H 60/37; H04H 60/43; H04H 60/45; H04H 60/46; H04H 60/56; H04H 60/58
USPC ......................................................... 725/13
See application file for complete search history.

(56) References Cited

U.S. PATENT DOCUMENTS

| | | |
|---|---|---|
| 2008/0051029 A1 | 2/2008 | Witteman et al. |
| 2010/0011389 A1 | 1/2010 | Lee et al. |
| 2010/0122279 A1 | 5/2010 | Zhang |
| 2011/0106587 A1 | 5/2011 | Lynch et al. |
| 2013/0010204 A1 | 1/2013 | Wang |
| 2014/0007152 A1 | 1/2014 | Pora et al. |
| 2014/0026158 A1 | 1/2014 | Rowe et al. |
| 2014/0130087 A1* | 5/2014 | Cho ................ H04N 21/6187 725/34 |
| 2015/0181269 A1 | 6/2015 | McMillan |

FOREIGN PATENT DOCUMENTS

| | | | |
|---|---|---|---|
| KR | 10-2005-0031304 | 4/2005 | |
| KR | 10-2008-0044499 | 5/2008 | |
| KR | 10-2010-0000464 | 1/2010 | |
| KR | 10-2010-0048727 | 5/2010 | |
| KR | 10-2010-0116306 | 11/2010 | |
| WO | WO-2008060032 A1 * | 5/2008 | ............ G06Q 30/02 |

* cited by examiner

| User terminal ID | User gender information | User age information | User residential area information | TV channel identification information | Occurrence time information (time stamp) | Other user-related information |
|---|---|---|---|---|---|---|
| A7D28374 | Male | 17 | Seoul | KBS1 | 2013-01-08 /17:56:28 | |
| K87234672 | Male | 64 | Daegu | SBS | 2013-01-09 /07:08:16 | |
| K7885212 | Female | 28 | Busan | YTN | 2013-01-10 /13:15:47 | |
| M4652024 | Male | 22 | Gwangju | KBS2 | 2013-01-11 /23:15:38 | |
| ⋮ | ⋮ | ⋮ | ⋮ | ⋮ | ⋮ | ⋮ |

FIG. 2

SYSTEM AND METHOD FOR SURVEYING BROADCASTING RATINGS

REFERENCE TO RELATED APPLICATIONS

This application is a continuation of U.S. patent application Ser. No. 16/180,523 (hereby incorporated by reference), filed Nov. 5, 2018, which is a continuation of U.S. patent application Ser. No. 15/496,888 (hereby incorporated by reference), filed Apr. 25, 2017, and issued as U.S. Pat. No. 10,165,317 on Dec. 25, 2018, which is a continuation of U.S. patent application Ser. No. 14/762,570 (hereby incorporated by reference), filed Jul. 22, 2015, and issued as U.S. Pat. No. 9,668,008 on May 30, 2017, which is a National Stage under 35 U.S.C. § 371 of International Patent Application No. PCT/KR2013/000576, filed Jan. 24, 2013, claiming priority to Korean Patent Application No. 10-2013-0007660, filed Jan. 23, 2013.

TECHNICAL FIELD

The present invention relates to a system and method for surveying broadcast ratings and, more particularly, to a system and method for surveying broadcast ratings, which are capable of accurately and conveniently obtaining rating information regarding a broadcasting channel, which is watched by a user who watches television (TV), and meta information, such as the age, job, residential area and the like of the user.

BACKGROUND ART

TV broadcast ratings play a significantly important role from the viewpoint of an advertiser as well as from the viewpoint of a broadcasting company, and thus TV broadcast ratings are surveyed and widely used in the scheduling of TV broadcast programs or advertising contracts. Accordingly, a method of surveying accurate TV broadcast ratings can be viewed as significantly important.

A method of distributing rating survey devices having a remote controller form to predetermined TV watching homes, allowing channels, to be watched, to be selected using the rating survey devices when TV is watched in the homes, receiving corresponding information using a server, and then collecting ratings has been known as a conventional method of surveying TV broadcast ratings. Furthermore, a separate rating survey device may be distributed to each TV viewer in each home, and statistics information regarding ratings may be calculated for each person or each specific watching group.

However, when the conventional method is used, a problem arises in that it is difficult to collect accurate rating information for each group because the case where the rating survey devices of counterparts are used frequently occurs in a user group in each home. Furthermore, a problem arises in that it is difficult to distribute rating survey devices to many viewers or maintain the rating survey devices because separate rating survey devices are required.

Meanwhile, Korean Patent Application Publication No. 10-2005-0031304 (published on Apr. 6, 2005) relates to "Method of Surveying Digital Broadcast Ratings." This patent publication discloses a method of surveying digital broadcast ratings, including a tenth step of broadcasting, by a broadcasting station, data, including rating survey request information, together with a broadcast program; a twentieth step of receiving, by a broadcasting receiver, the broadcast program broadcast at the tenth step, separating the data from the broadcast program, and determining whether the data includes the rating survey request information; a thirtieth step of determining a broadcast program watched by a user if it is determined at the twentieth step that the rating survey request information is included; a fortieth step of accessing a rating survey server if the broadcast program watched by the user is determined at the thirtieth step, searching the data for a service identification (ID) corresponding to the broadcast program determined to be watched, and sending the retrieved service ID; and a fiftieth step of storing, by the rating survey server, the service ID of the fortieth step in a database and surveying ratings based on the stored service ID.

However, according to this method, a problem arises in that a broadcast program must be broadcast with data including rating survey request information being included therein. Furthermore, a limitation is imposed in that a broadcasting receiver must receive such data, separate the data, and determine whether the corresponding data is included. Accordingly, the above method is problematic as a broadcast rating survey method in that a data processing process is complicated and a separate reception device intended for the method must be configured and managed.

DISCLOSURE

Technical Problem

The present invention is intended to overcome the above-described problems, and an object of the present invention is to provide a system and method that can conveniently and accurately determine the channel identification information of a broadcast channel that is watched by a user using fingerprint data, thereby generating accurate rating statistics information.

Furthermore, another object of the present invention is to provide a system and method that enable a user terminal to start to extract a fingerprint when a specific condition is met in a TV signal reception device, such as a set-top box, thereby generating meaningful rating statistics information.

Furthermore, still another object of the present invention is to provide a system and method that can extract a fingerprint using a user terminal, such as a smart phone, when a specific condition is met, perform matching based on the extracted fingerprint, and obtain the identification information of a TV channel, thereby generating personalized rating statistics information in various and plentiful forms.

Technical Solution

According to an aspect of the present invention, there is provided a system for surveying broadcast ratings, including: a television (TV) signal reception device configured to receive a broadcast signal, to send the broadcast signal to a TV, and to send an event signal to a rating statistics information server when a predetermined condition occurs; the rating statistics information server configured to send a fingerprint extraction request signal to a previously registered user terminal when receiving the event signal from the TV signal reception device; and the user terminal configured to extract the fingerprint data of an audio signal generated from the TV being watched by a user when receiving the fingerprint extraction request signal from the rating statistics information server, and to send the extracted fingerprint data and user identification information to the rating statistics information server; wherein the rating statistics information server obtains the channel identification information of a TV channel being watched by the user based on the fingerprint data transmitted by the user terminal, and generates rating statistics information based on the obtained channel identification information and the user identification information.

In this case, the TV signal reception device may be configured to send the event signal to the rating statistics information server when broadcast signals are successively received over a specific channel for a predetermined time.

Furthermore, the event signal transmitted by the TV signal reception device may include the identification information of the TV signal reception device.

Furthermore, the rating statistics information server may be configured to determine one of previously registered user terminals, to which the fingerprint extraction request signal is to be transmitted, based on the identification information of the TV signal reception device included in the event signal, and to send the fingerprint extraction request signal to the determined user terminal.

Furthermore, the user terminal may be configured to display a message, indicating that the fingerprint extraction request signal transmitted by the rating statistics information server has been received, and a selection interface, enabling the user to start to extract the fingerprint data of the audio signal, via a display unit when receiving the fingerprint extraction request signal, to extract the fingerprint data of the audio signal generated from the TV being watched by the user when the user selects the selection interface, and to send the extracted fingerprint data and the user identification information to the rating statistics information server.

Furthermore, the user terminal may be configured to send time information about a time at which the fingerprint data is extracted, together with the extracted fingerprint data and the user identification information, to the rating statistics information server.

Furthermore, the rating statistics information server may be configured to obtain the channel identification information of the TV channel being watched by the user by searching for the TV channel including fingerprint data that matches the fingerprint data transmitted by the user terminal.

Furthermore, the rating statistics information server may be configured to generate the rating statistics information by storing the channel identification information of the TV channel, being watched by the user, together with information about at least one of an age, a gender, a residential area and a job stored in association with the user identification information.

According to another aspect of the present invention, there is provided a method of surveying broadcast ratings, including: a first step of receiving, by a television (TV) signal reception device, a broadcast signal, sending, by the TV signal reception device, the broadcast signal to a TV, and sending, by the TV signal reception device, an event signal to a rating statistics information server when a predetermined condition occurs while sending the broadcast signal; a second step of sending, by the rating statistics information server, a fingerprint extraction request signal to a previously registered user terminal when receiving the event signal from the TV signal reception device; a third step of extracting, by the user terminal, the fingerprint data of an audio signal generated from the TV being watched by a user when receiving the fingerprint extraction request signal from the rating statistics information server, and sending, by the user terminal, the extracted fingerprint data and user identification information to the rating statistics information server; and a fourth step of obtaining, by the rating statistics information server, the channel identification information of a TV channel being watched by the user based on the fingerprint data transmitted by the user terminal, and generating, by the rating statistics information server, rating statistics information based on the obtained channel identification information and the user identification information.

According to still another aspect of the present invention, there is provided a system for surveying broadcast ratings, including: a television (TV) signal reception device configured to receive a broadcast signal, to send the broadcast signal to a TV, and to send an event signal to a user terminal when a predetermined condition occurs; the user terminal configured to extract the fingerprint data of an audio signal generated from the TV being watched by a user when receiving the event signal from the TV signal reception device, and to send the extracted fingerprint data and user identification information to a rating statistics information server; and the rating statistics information server configured to obtain the channel identification information of a TV channel being watched by the user based on the fingerprint data transmitted by the user terminal, and to generate rating statistics information based on the obtained channel identification information and the user identification information.

Advantageous Effects

According to the present invention, there can be provided the system and method that can conveniently and accurately determine the channel identification information of a broadcast channel that is watched by a user using fingerprint data, thereby generating accurate rating statistics information.

Furthermore, according to the present invention, there is achieved the effect of enabling a user terminal to start to extract a fingerprint when a specific condition is met in a TV signal reception device, such as a set-top box, thereby generating meaningful rating statistics information.

Furthermore, according to the present invention, there can be provided the system and method that can extract a fingerprint using a user terminal, such as a smart phone, when a specific condition is met, perform matching based on the extracted fingerprint, and obtain the identification information of a TV channel, thereby generating personalized rating statistics information each person in various and plentiful forms.

DESCRIPTION OF DRAWINGS

FIG. 2 is a diagram showing a case where a rating statistics information server 20 generates rating statistics information in accordance with a user terminal 30;

BEST MODE

Embodiments of the present invention are described in detail below with reference to the accompanying drawings.

Figure 1:
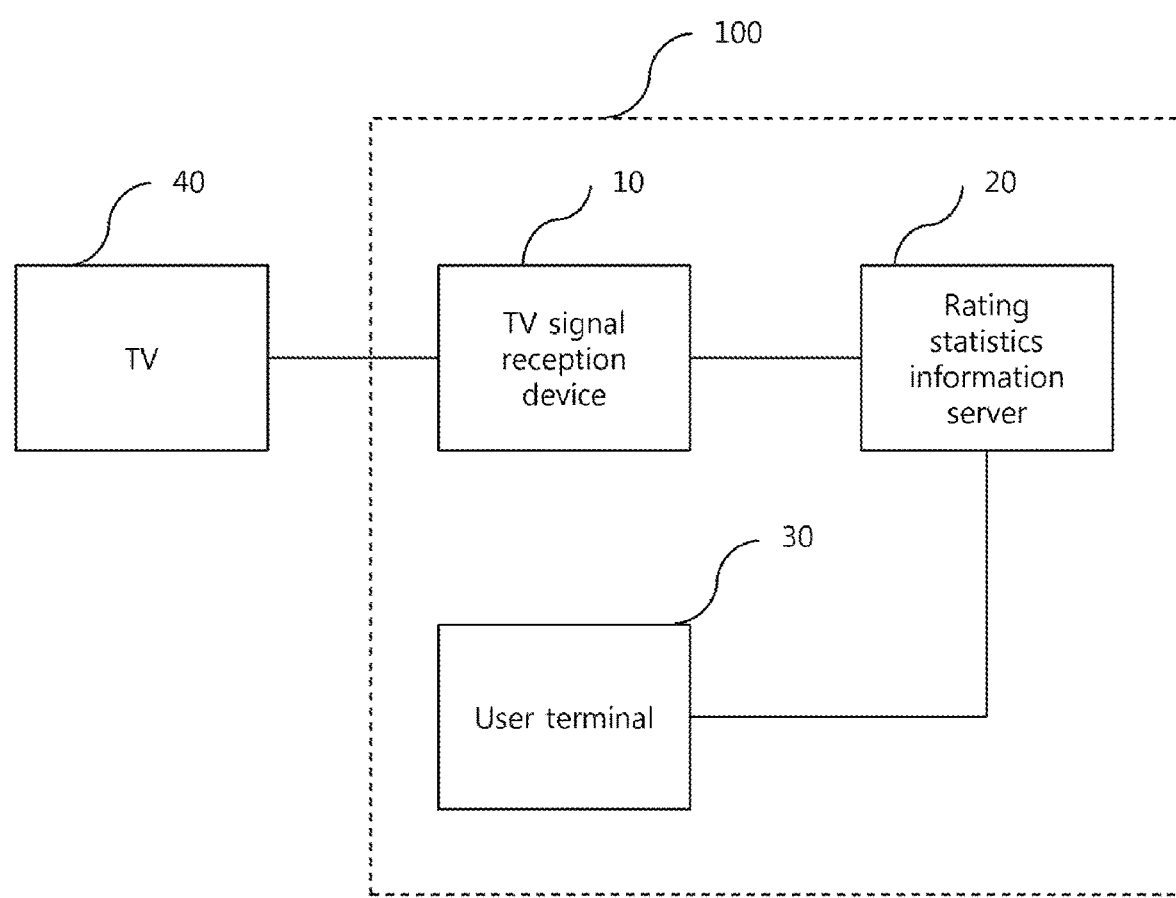
FIG. 1 is a diagram showing the overall configuration and connection relationship of a system 100 for surveying broadcast ratings according to an embodiment of the present invention.

FIG. 1 is a diagram showing the overall configuration and connection relationship of a system 100 for surveying broadcast ratings according to an embodiment of the present invention.

Referring to FIG. 1, the system 100 for surveying broadcast ratings of the present embodiment includes a TV signal reception device 10, a rating statistics information server 20, and a user terminal 30.

In FIG. 1, the TV signal reception device 10 is directly connected to TV 40. The TV signal reception device 10, the rating statistics information server 20, and the user terminal 30 are connected over a network, such the Internet or a mobile communication network.

The TV signal reception device 10 functions to receive a broadcast signal and send the broadcast signal to the TV 40, and also functions to send an event signal to the rating statistics information server 20 when a predetermined condition occurs. The TV signal reception device 10 may be, for example, a conventionally known set-top box for receiving cable TV broadcast signals. The function of performing the present invention, i.e., a configuration for sending an event signal to the rating statistics information server 20 when a predetermined condition occurs, may be implemented in hardware or software, and the hardware or software may be included in the set-top box.

That is, the TV signal reception device 10 of the present invention may be configured in a conventional set-top box or another device in an integrated manner as long as it includes a means in which the function of receiving a broadcast signal and sending the broadcast signal to a TV and the function of sending an event signal to the rating statistics information server 20 when a predetermined condition occurs have been implemented by hardware or software. In some cases, the TV signal reception device 10 may be implemented as a separate device.

The TV signal reception device 10 sends an event signal to the rating statistics information server 20 when a predetermined condition occurs. In this case, the predetermined condition may be, for example, a case where broadcast signals are successively received through a specific channel for a predetermined period. That is, when a user continues to watch a specific TV channel for a specific or longer period, the TV signal reception device 10 may send an event signal to the rating statistics information server 20.

In this case, the event signal preferably includes the identification information of the TV signal reception device 10. The identification information of the TV signal reception device 10 may be the same as an ID uniquely assigned to each TV signal reception device 10. The rating statistics information server 20 may determine the TV signal reception device 10, which has sent the event signal, based on the identification information.

The rating statistics information server 20 functions to send a fingerprint extraction request signal to a user terminal that has been previously registered when the event signal is received from the TV signal reception device 10. As described above, the rating statistics information server 20 may receive the identification information of the TV signal reception device 10, together with the event signal, from the TV signal reception device 10. The rating statistics information server 20 may determine a user terminal, which has been previously registered, in accordance with the received identification information of the TV signal reception device 10, and may send the fingerprint extraction request signal to the determined user terminal 30. In this case, it is preferred that the rating statistics information server 20 may previously register, for example, the telephone number of the user terminal 30 in accordance with the identification information of the TV signal reception device 10 and send the fingerprint extraction request signal based on the registered telephone number of the user terminal 30.

A method by which the fingerprint extraction request signal is sent to the user terminal 30 is not particularly limited, but a conventionally known technology may be used without change as the method. For example, the fingerprint extraction request signal may be sent to the user terminal 30 in the form of a message, such as an SMS or MMS message. Alternatively, when the user terminal 30 is a so-called smart phone, the fingerprint extraction request signal may be sent in the form of a messaging service using an application. As will be described later, when a fingerprint extraction request signal is received from the rating statistics information server 20, the user terminal 30 extracts the fingerprint data of an audio signal generated from a TV being watched by a user, and sends the extracted fingerprint data and user identification information to the rating statistics information server 20. This function may be implemented in an application form when the user terminal 30 is a smart phone. When a messaging service function is also included in the application, a fingerprint extraction request signal may be sent in the form of a messaging service between the rating statistics information server 20 and the user terminal 30. As an example of the messaging service, a method, such as Google Cloud Message Service from Google Inc., may be used. Furthermore, any conventionally known method may also be applied to the present invention without change. Since the present invention is not intended for a message service itself, a detailed description thereof is omitted.

When receiving a fingerprint extraction request signal from the rating statistics information server 20, the user terminal 30 functions to extract the fingerprint data of an audio signal generated from a TV being watched by a user and send the extracted fingerprint data and user identification information to the rating statistics information server 20.

In the present invention, the user terminal 30 may be a computer, a notebook, a tablet PC, or a mobile communication terminal. The user terminal 30 is preferably a so-called smart phone in which an application can be installed and which has the function of accessing a network, such as the Internet.

In the user terminal 30, the function of extracting the fingerprint data of an audio signal generated from a TV being watched by a user and sending the extracted fingerprint data and user identification information to the rating statistics information server 20 when a fingerprint extraction request signal is received from the rating statistics information server 20, as described above, may be implemented in an application form. Furthermore, it is preferable to also include a configuration for receiving a fingerprint extraction request signal from the rating statistics information server 20 and sending fingerprint data and user identification information to the rating statistics information server 20, as described above. It will be apparent that this configuration may be implemented in the operating system of the user terminal 30 in an integrated manner and or may be implemented in an integrated manner in terms of hardware.

When receiving a fingerprint extraction request signal from the rating statistics information server 20, the user terminal 30 may be allowed to immediately extract the fingerprint data of an audio signal generated from a TV being watched by a user automatically and send the extracted fingerprint data and user identification information to the rating statistics information server 20. In this case, when the fingerprint extraction request signal is received the audio signal generated from a TV is automatically obtained and the fingerprint data of the obtained audio signal is extracted by the application or operating system of the user terminal 30 without the intervention of a user. In this case, since the user terminal 30 automatically operates and is thus unable to separately identify an audio signal generated from a TV, the user terminal 30 obtains an audio signal, obtained by an audio signal acquisition means, such as the microphone of the user terminal 30, without change.

Meanwhile, there may be a case where the user terminal 30 is not placed near the TV 40. In this case, the user terminal 30 may obtain an audio signal and extract fingerprint data through the intervention of a user. For example, when the user terminal 30 receives the fingerprint extraction request signal transmitted by the rating statistics information server 20, the user terminal 30 may be allowed to display a message indicating that the fingerprint extraction request signal has been received and a selection interface enabling a user to start extracting the fingerprint data of an audio signal via a display unit. When the user selects the selection interface, the user terminal 30 may be allowed to extract the fingerprint data of the audio signal generated from a TV being watched by the user and send the extracted fingerprint data and user identification information to the rating statistics information server 20. In this case, the message output to the display unit may include a message, for example, "Please place the user terminal near TV" or the like, and a selection part, such as "Start to extract fingerprint data. OK," is displayed on the selection interface. Accordingly, when the user heads for the TV or places the user terminal 30 near the TV and selects the selection interface, the user terminal 30 may start to extract the fingerprint data of an audio signal obtained while the audio signal is being obtained.

Meanwhile, in the present invention, the fingerprint data refers to characteristic data indicative of the characteristics of data, such as audio data, image data or video data, and is also referred to as fingerprint data, DNA data, or gene data. Conventional several methods have been proposed as a technology for extracting such fingerprint data and performing the comparison of data using the extracted fingerprint data. Recently, since the identity of data can be easily determined using such a fingerprint finger, print data is widely used in the field of digital rights management (DRM). For example, in the case of audio data, fingerprint data may be generated using various types of characteristic data (e.g., frequency, amplitude, etc.) indicative of the characteristics of the audio data. In the case of image or video data, fingerprint data may be generated using various types of characteristic data (e.g., the motion vector information and color information of a frame, etc.) of the image or video data. Since the present invention is not intended for a method of extracting (generating) such fingerprint data itself and any type of fingerprint generation/extraction method according to a conventional technology may be used without change, a detailed description thereof is omitted. According to Korean Patent Application Nos. 10-2007-0044251 (entitled "Method and Apparatus for Generating Audio Fingerprint Data and Comparing Audio Data Using the Same"), 10-2007-0054601 (entitled "Method and Apparatus for Determining Identity and Detecting Common Frame of Moving Picture Data"), 10-2007-0060978 (entitled "Method and System for Clustering Moving Picture Data Having Identity), 10-2007-0071633 (entitled "Method and Apparatus for Providing Video Data Search Service Using Data Cluster"), 10-2007-0091587 (entitled "Method and Apparatus for Setting and Providing Advertisement Data Using Video Data Cluster"), and 10-2008-0051688 (entitled "Method of Processing Moving Picture and Apparatus thereof") filed by the present applicant, a method of generating the fingerprint data of audio, image or video data and a method of performing the comparison of data using such fingerprint data are described. It will be apparent that the fingerprint data extraction method of the present applicant may also be used in the present invention. In short, a conventional fingerprint extraction method may be used in the present invention without change regardless of the type of method of extracting fingerprint data.

The user terminal 30 extracts fingerprint data while obtaining an audio signal. In this case, the user terminal 30 extracts the fingerprint data of the audio signal during a specific time T after it has started to operate. Although the discrimination capability of fingerprint data increases as the time T increases, time delay in data processing and a network load problem occur, and thus the time T is preferably selected within an appropriate range.

Furthermore, the user terminal 30 may be allowed to also obtain time information about the time at which fingerprint data is extracted while extracting the fingerprint data and send the obtained time information, together with the fingerprint data, to the rating statistics information server 20.

Furthermore, the user terminal 30 may send user identification information, together with fingerprint data, to the rating statistics information server 20. In this case, the user identification information may be the same as an identifier (ID) uniquely set in each user. The user identification information may be used when the rating statistics information server 20 generates rating statistics information.

Meanwhile, the rating statistics information server 20 obtains the channel identification information of a TV channel that is watched by a user based on fingerprint data transmitted by the user terminal 30 and generates rating statistics information based on the obtained channel identification information and user identification information.

For this purpose, the rating statistics information server 20 extracts fingerprint data for each specific time with respect to the audio signals of broadcast signals in real time while receiving all broadcast signals broadcast over a TV channel. The rating statistics information server 20 also stores time information about the time at which the fingerprint data is extracted, together with the extracted fingerprint data. When the fingerprint data and the time information are transmitted by the user terminal 30 in this state, the rating statistics information server 20 may obtain the channel identification information of the TV channel corresponding to the fingerprint data transmitted by the user terminal 30 by searching for fingerprint data that matches the received fingerprint data. In this case, when the time information is additionally used, the accuracy of search can be increased. All conventional methods may be used as a method of performing comparison and matching regarding the fingerprint data. Since the present invention is not intended for a fingerprint matching method itself, a detailed description thereof is omitted.

The fingerprint data that matches fingerprint data transmitted by the user terminal 30 may be searched for using the above process, and thus the channel identification information of a TV channel can be conveniently determined.

Once the channel identification information of the TV channel corresponding to the fingerprint data transmitted by the user terminal 30 has been determined, as described above, rating statistics information is generated by storing the channel identification information of the TV channel that is being watched by a user, together with information about at least one of an age, a gender, a residential area and a job stored in association with user identification information, i.e., the identifier (ID) of the user terminal 30 transmitted by the user terminal 30, in accordance with the user identification information.

FIG. 2 is a diagram showing a case where the rating statistics information server 20 generates rating statistics information in accordance with the user terminal 30.

As shown in FIG. 2, it may be seen that a gender, an age, a residential area, TV channel identification information, occurrence time information, and other user-related information are generated in accordance with the ID of each user terminal 30. In this case, the ID of the user terminal 30 is transmitted by the user terminal 30. Meanwhile, user age information and residential area information may be previously stored in accordance with the ID of the user terminal 30.

The TV channel identification information is determined by the rating statistics information server 20 through a process, such as that described above, and the occurrence time information is stored using the information transmitted by the user terminal 30 or the time information obtained by the rating statistics information server 20.

The user-related information, other than the information illustrated in FIG. 2, may be used when necessary.

Figure 3:
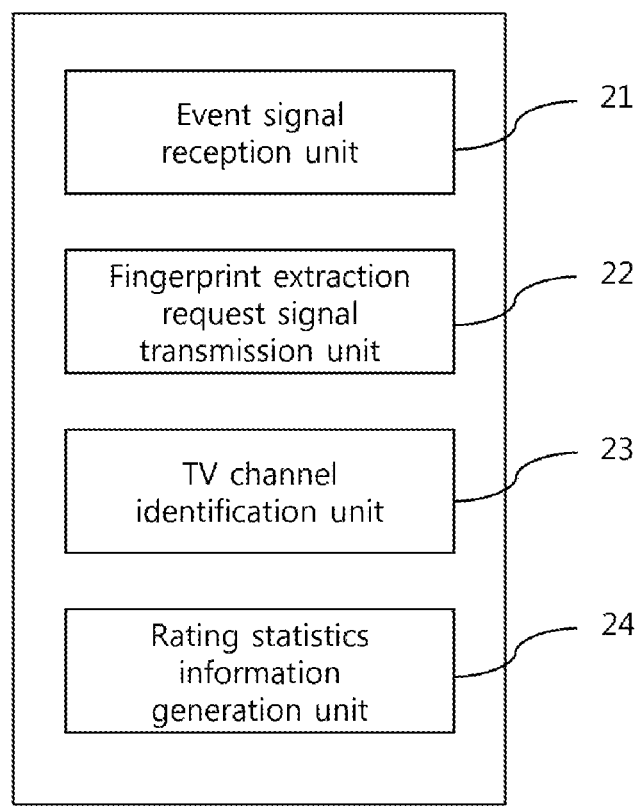
FIG. 3 is a diagram showing the internal configuration of the rating statistics information server 20 illustrated in FIGS. 1 and 2.

FIG. 3 is a diagram showing the internal configuration of the rating statistics information server 20 illustrated in FIGS. 1 and 2.

As described above, the rating statistics information server 20 functions to receive an event signal from the TV signal reception device 10, to send a fingerprint extraction request signal to the user terminal 30 that has been previously registered, to obtain the channel identification information of a TV channel being watched by a user based on fingerprint data transmitted by the user terminal 30, and to generate rating statistics information based on the obtained channel identification information and user identification information.

For this purpose, the rating statistics information server 20 includes an event signal reception unit 21, a fingerprint extraction request signal transmission unit 22, a TV channel identification unit 23, and a rating statistics information generation unit 24.

The event signal reception unit 21 functions to receive an event signal generated and transmitted by the TV signal reception device 10. The fingerprint extraction request signal transmission unit 22 functions to identify the user terminal 30 that has been previously registered when receiving an event signal from the TV signal reception device 10, and to send a fingerprint extraction request signal to the confirmed user terminal 30.

The TV channel identification unit 23 functions to receive fingerprint data and time information from the user terminal 30, to identify a TV channel being watched by a user by performing matching on the fingerprint data based on the received fingerprint data and time information, and to obtain TV channel identification information. Furthermore, the rating statistics information generation unit 24 functions to generate rating statistics information, such as that illustrated in FIG. 2, in accordance with the ID of the user terminal 30, and to store and manage the generated rating statistics information.

Figure 4:
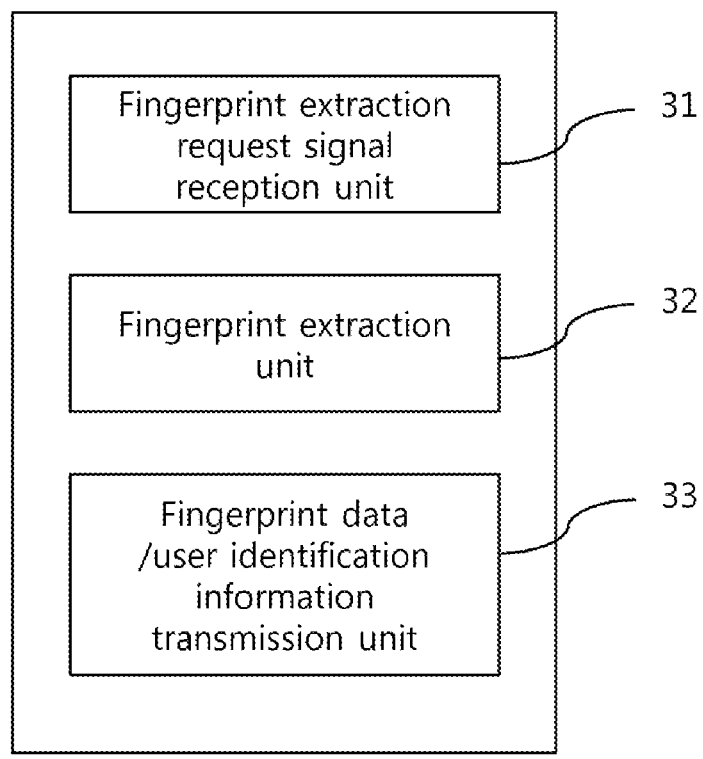
FIG. 4 is a diagram showing the internal configuration of the user terminal 30 that is used in the present invention.

FIG. 4 is a diagram showing the internal configuration of the user terminal 30 that is used in the present invention.

As described above, the user terminal 30 functions to receive a fingerprint extraction request signal from the rating statistics information server, to extract the fingerprint data of an audio signal generated from a TV being watched by a user, and to send the extracted fingerprint data and user identification information to the rating statistics information server.

For this purpose, the user terminal 30 includes a fingerprint extraction request signal reception unit 31, a fingerprint extraction unit 32, and a fingerprint data/user identification information transmission unit 33.

The fingerprint extraction request signal reception unit 31 functions to receive a fingerprint extraction request signal transmitted by the rating statistics information server 20. The fingerprint extraction unit 32 functions to extract the fingerprint data of an audio signal generated from a TV being watched by a user when a fingerprint extraction request signal is received. The fingerprint data/user identification information transmission unit 33 functions to send the extracted fingerprint data and user identification information (the ID of the user terminal 30) to the rating statistics information server 20.

Figure 5:
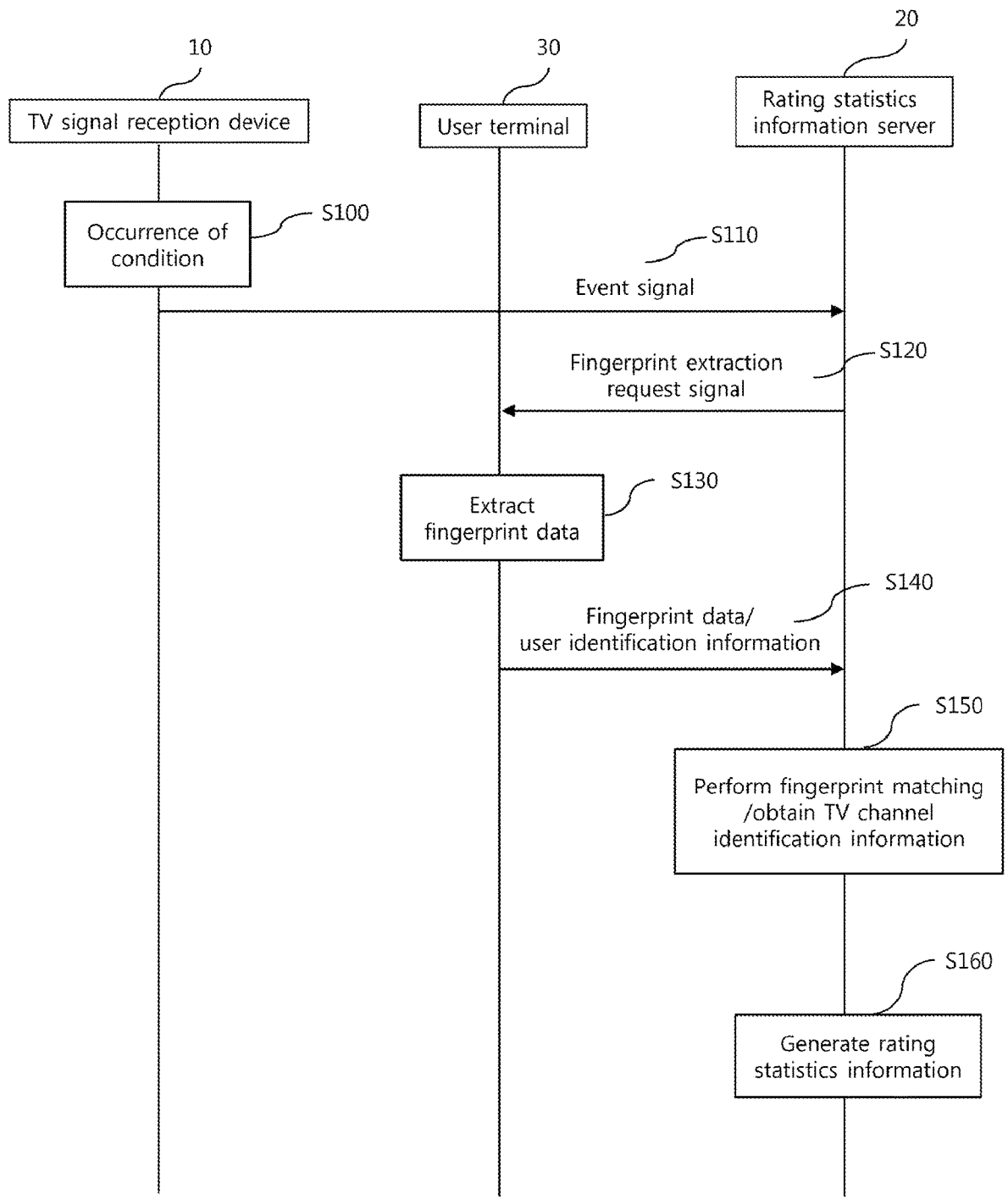
FIG. 5 is a flowchart showing an embodiment of a method according to the present invention, which is performed in the system 100 for surveying broadcast ratings, such as that described in FIGS. 1 to 4.

FIG. 5 is a flowchart showing an embodiment of a method according to the present invention, which is performed in the system 100 for surveying broadcast ratings, such as that described in FIGS. 1 to 4.

Referring to FIG. 5, first, the TV signal reception device 10 sends an event signal to the rating statistics information server 20 at step S110 when a predetermined condition occurs, as in the case where a user continues to stay in a specific channel at step S100.

When the event signal is received from the TV signal reception device 10, the rating statistics information server 20 identifies the user terminal 30 that has been previously registered and sends a fingerprint extraction request signal to the confirmed user terminal 30 at step S120.

Thereafter, when the fingerprint extraction request signal is received from the rating statistics information server 20, the user terminal 30 extracts the fingerprint data of an audio signal generated from a TV being watched by the user at step S130, and sends the extracted fingerprint data and user identification information to the rating statistics information server 20 at step S140.

The rating statistics information server 20 obtains the channel identification information of a TV channel being watched by the user by performing matching on the fingerprint data using a method, such as that described above, based on the fingerprint data transmitted by the user terminal 30 at step S150, and generates rating statistics information in a form, such as that of FIG. 2, based on the obtained channel identification information and the user identification information at step S160.

Although the present invention has been described with reference to preferred embodiments of the present invention, the present invention is not limited to these embodiments, and it will be apparent to those skilled in the art that modified and changed practice can be performed in various forms.

For example, the TV signal reception device 10 may register information about the user terminal 30 and send the user terminal information to the rating statistics information server 20. In this case, the TV signal reception device 10 may not send the ID of the TV signal reception device 10. The rating statistics information server 20 may be allowed to send a fingerprint extraction request signal to the user terminal 30 based on the received user terminal information (ID).

Furthermore, the rating statistics information of FIG. 2 is illustrative, and it will be apparent that the rating statistics information may be generated in a form different from that illustrated in FIG. 2.

Furthermore, according to another embodiment of the present invention, when a predetermined condition occurs, the TV signal reception device 10 may be configured to send an event signal to the user terminal 30 instead of sending the event signal to the rating statistics information server 20. In this case, identification information, such as the telephone number of the user terminal 30 that will receive the event signal, has been previously registered in the TV signal reception device 10. Once an event signal has been received, the user terminal 30 extracts fingerprint data, and sends user identification information, together with the extracted fingerprint data, to the rating statistics information server 20. The rating statistics information server 20 generates rating statistics information using a process identical to that of the aforementioned embodiment.

Meanwhile, in the aforementioned embodiment, the configurations of the user terminal 30 and the TV signal reception device 10 may be implemented as hardware or software. It will be apparent to those skilled in the art that when the configurations are implemented as software, they may be configured in an operating system in an integrated manner and or may be implemented using a separate application.

Furthermore, according to another embodiment of the present invention, the TV channel identification unit 23 of the rating statistics information server 20 may be configured as an external separate server. The process of identifying a TV channel through fingerprint matching may be processed by the separate server, and the result value (channel identification information) of the process may be transferred to the rating statistics information server 20.

Furthermore, according to still another embodiment of the present invention, the user terminal 30 may obtain only an audio signal without extracting a fingerprint and send the audio signal to the rating statistics information server 20. The rating statistics information server 20 may extract a fingerprint from the received audio signal.

What is claimed is:

1. A system for surveying broadcast ratings, comprising:
    a television (TV) signal reception device configured to receive a broadcast signal, to send the broadcast signal to a TV, and to send an event signal to a rating statistics information server when a predetermined condition occurs;
    the rating statistics information server configured to send a fingerprint request signal to a previously registered user terminal when receiving the event signal from the TV signal reception device; and
    the user terminal configured to extract fingerprint data of an audio signal generated from the TV being watched by a user when receiving the fingerprint request signal from the rating statistics information server, and to send the extracted fingerprint data and user identification information to the rating statistics information server;
    wherein the rating statistics information server obtains channel identification information of a TV channel being watched by the user based on the fingerprint data transmitted by the user terminal, and generates rating statistics information based on the obtained channel identification information and the user identification information.

2. A method for surveying broadcast ratings, the method comprising:
    receiving by a server an event signal from a television (TV) signal reception device that is configured to receive a broadcast of a TV channel;
    upon receiving the event signal, sending by the server, to a user terminal associated with the TV signal reception device, a fingerprint request signal;
    thereafter receiving by the server from the user terminal, in response to the sent fingerprint request signal, (i) fingerprint data generated by the user terminal based on audio of the TV channel and (ii) user identification information;
    obtaining by the server, based on the fingerprint data received from the user terminal in response to the fingerprint request signal, channel identification information of the TV channel; and
    generating by the server rating statistics information based on the obtained channel identification information and the user identification information.

3. The method of claim 2, wherein the user terminal is at least one of a computer, a notebook, a tablet PC, or a mobile communication terminal.

4. The method of claim 2, wherein the user terminal is a smart phone.

5. The method of claim 2, wherein the TV signal reception device is a set top box.

6. The method of claim 2, further comprising:
    receiving by the server, from the TV signal reception device, identification information of the user terminal,
    wherein sending the fingerprint request signal to the user terminal is based on the received identification information of the user terminal.

7. The method of claim 6, wherein the event signal received by the server includes identification information of the TV signal reception device, the method further comprising:
    determining by the server, based on the identification information of the TV signal reception device included in the event signal, the user terminal to which the fingerprint request signal is to be sent.

8. The method of claim 2, wherein the event signal is sent from the TV signal reception device to the server when broadcast of the TV channel is received for a predetermined time.

9. The method of claim 2, further comprising receiving by the server from the user terminal, together with the fingerprint data and the user identification information, time information about a time at which the fingerprint data is generated.

10. The method of claim 2, wherein obtaining by the server the channel identification information of the TV channel comprises searching for the TV channel based on reference fingerprint data of the TV channel matching the fingerprint data received from the user terminal.

11. The method of claim 2, wherein generating by the server the rating statistics information based on the obtained channel identification information and the user identification information comprises storing the channel identification information of the TV channel, together with information about at least one of an age, a gender, a residential area, or a job, associated with the user identification information.

12. The method of claim 2, wherein sending the fingerprint request signal to the user terminal comprises sending the fingerprint request signal as an SMS message, an MMS message, or an application messaging service message.

13. A server comprising:
an event signal reception unit;
a fingerprint request signal transmission unit;
a television (TV) channel identification unit; and
a rating statistics information generation unit,
wherein the server is configured to receive an event signal from a TV signal reception device that receives a broadcast of a TV channel,
wherein the server is further configured to send a fingerprint request signal to a user terminal upon receiving the event signal from the TV signal reception device, and to receive from the user terminal, in response to the sent fingerprint request signal, (i) fingerprint data generated by the user terminal based on audio of the TV channel and (ii) user identification information,
wherein the server is further configured to obtain, based on the fingerprint data received from the user terminal in response to the fingerprint request signal, channel identification information of the TV channel, and
wherein the server is further configured to generate rating statistics information based on the obtained channel identification information and the user identification information.

14. The server of claim 13, wherein the user terminal is at least one of a computer, a notebook, a tablet PC, or a mobile communication terminal.

15. The server of claim 13, wherein the TV signal reception device is a set top box.

16. The server of claim 13, wherein the server is further configured to receive, from the TV signal reception device, identification information of the user terminal,
wherein sending the fingerprint request signal to the user terminal is based on the received identification information of the user terminal.

17. The server of claim 13, wherein the server is further configured to determine, based on identification information of the TV signal reception device included in the event signal, the user terminal to which the fingerprint request signal is to be sent and to send the fingerprint request signal to the determined user terminal.

18. The server of claim 13, wherein the event signal is sent from the TV reception device to the server when broadcast of the TV channel is received for a predetermined time.

19. The server claim 13, wherein the server is further configured to receive from the user terminal, together with the fingerprint data and the user identification information, time information about a time at which the fingerprint data is generated.

20. The server claim 13, wherein the server is further configured to obtain the channel identification information of the TV channel by searching for the TV channel based on reference fingerprint data of the TV channel matching the fingerprint data received from the user terminal.

* * * * *